United States Patent [19]

Bakish

[11] Patent Number: 4,718,393
[45] Date of Patent: Jan. 12, 1988

[54] AIR-FUEL HOMOGENIZER

[76] Inventor: Richard J. Bakish, 75 Madison St., E. Weymouth, Mass. 02189

[21] Appl. No.: 933,012

[22] Filed: Nov. 20, 1986

[51] Int. Cl.$^4$ .............................................. F02M 29/04
[52] U.S. Cl. .................................... 123/593; 123/545; 48/189.4
[58] Field of Search ............... 123/593, 545; 48/189.4, 48/189.2

[56] References Cited

U.S. PATENT DOCUMENTS

| | | | |
|---|---|---|---|
| 1,843,383 | 2/1932 | Cottrell | 48/189.4 |
| 2,273,957 | 2/1942 | Harrell | 48/189.5 |
| 3,297,305 | 1/1967 | Walden | 48/189.4 |
| 3,435,810 | 4/1969 | Busse | 123/590 |
| 3,498,279 | 3/1970 | Seeley, Jr. | 123/549 |
| 3,645,243 | 2/1972 | Ohlsson | 123/593 |
| 4,338,906 | 7/1982 | Cox | 123/545 |

Primary Examiner—E. Rollins Cross
Attorney, Agent, or Firm—John P. McGonagle

[57] ABSTRACT

A device for increasing the homogenity of the air-fuel stream between the carburetor and the intake manifold of an internal combustion engine. A first cylindrical member is connected between the carburetor and intake manifold, said first cylindrical member having within it multiple sets of vanes for mixing the gaseous stream flowing within. Means for controlled heating of the gaseous stream moving through the first cylindrical member is provided. Means for driving the gaseous stream through the first cylindrical member is also provided.

13 Claims, 4 Drawing Figures

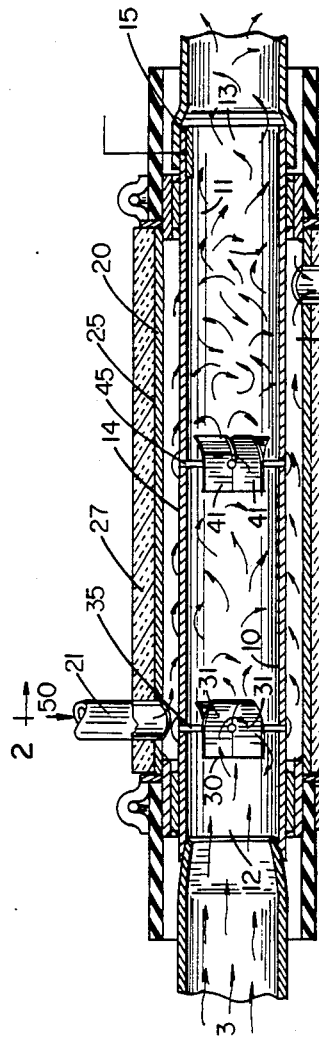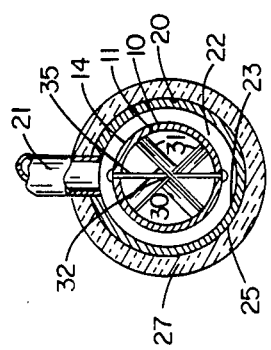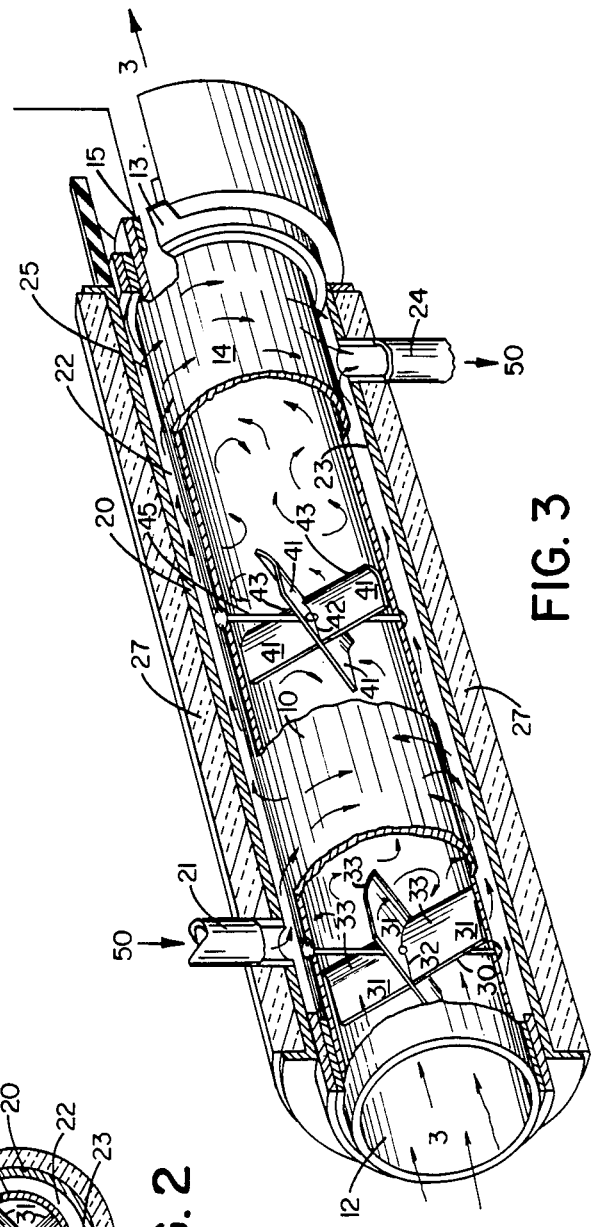

AIR-FUEL HOMOGENIZER

BACKGROUND OF THE INVENTION

This invention broadly relates to internal combustion engines, and more particularly to a device within the engine for producing a homogeneous mixture of fuel and air for distribution to the engine's cylinders.

The most common automotive fuel, gasoline, is not composed of uniform hydrocarbon molecules. Gasoline is actually a mixture of many different compounds that are distilled from crude oil, and each distillate vaporizes differently. Some parts of gasoline vaporize easily at low temperatures to help a cold engine start. Other parts have a much higher point to prevent the fuel from vaporizing in the fuel lines enroute to the engine.

Without complete vaporization a truly homogeneous air-fuel mixture is not formed between the carburetor (or fuel injection unit) and the engine's intake manifold. Conventional carburetors attempt to vaporize the gasoline with atomizing nozzles, but not all of the fuel atomized by the nozzles of the carburetor in a conventional internal combustion engine truly forms into a homogeneous air-fuel mixture. As a result, in a typical conventional internal combustion engine, only part of the fuel entering the combustion chambers is in a combustible state. Without a truly homogeneous air-fuel mixture there is only partial combustion of the fuel. This leads to exhaust gas problems, a reduction in engine efficiency, and increased consumption of fuel.

SUMMARY OF THE INVENTION

The present invention is intended for installation in the gas stream between the carburetor and the intake manifold of internal combustion engines. Its primary object is the more complete vaporization and mixture of the stream of fuel and air between the carburetor and the intake port of the engine block. The invention is comprised of a first cylindrical member in which there is provided two or more sets of vanes which are configured so that the first set of vanes twirls the gaseous stream in one direction, and the next set of vanes reverses such twirling motion with a corresponding greater admixture of the contents, and so on with each additional set of vanes reversing the twirling motion of the previous set of vanes. The first cylindrical member is concentrically placed within a second cylindrical member. Hot exhaust gases or heated coolant from the engine are channeled into the second cylindrical member around the first cylindrical member and then exiting the second cylindrical member. This action heats the gaseous stream within the first cylindrical member, thereby increasing the vaporization and mixing within the stream. An exhaust gas driven turbocharger increases the pressure of the gaseous stream so that the resistance of the vanes will not affect the gaseous stream flow to the engine. The effect of the heat, as well as a rough textured wall within the first cylindrical member will eliminate the tendency of the fuel within the gaseous stream to condensate along the first cylindrical member's inside wall.

BRIEF DESCRIPTION OF THE DRAWINGS

FIG. 1 is a cross-sectional side view of the present invention;

FIG. 2 is a front sectional view along the section 2—2 of the invention of FIG. 1;

FIG. 3 is a perspective view of the invention, with portions cut away to more completely illustrate the invention.

DETAILED DESCRIPTION OF THE INVENTION

Figure 4:
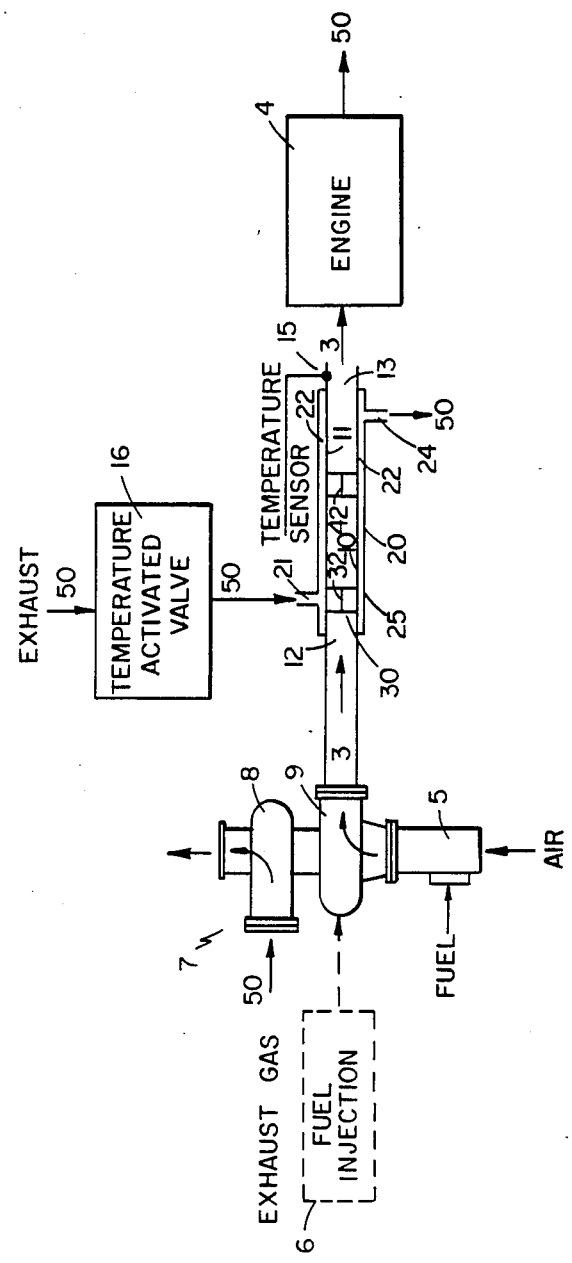
FIG. 4 is a schematic block diagram of the invention illustrating the invention's relationship with the carburetor and the engine manifold.

Referring more particularly to the drawings wherein like numerals indicate like elements, the invention is comprised of a first cylindrical member 10 in which there are provided two sets of vanes 30 and 40, respectively, each set 30 and 40 having four, generally rectangular blades 31 and 41, respectively, and a second cylindrical member 20 into which the first cylindrical member 10 is concentrically placed. The gaseous stream 3 enters the first cylindrical member 10 from a carburetor 5 or fuel injection unit 6 upstream at reference numeral 12 and exits downstream at 13. The blades 31 of the upstream vane set 30 lie in planes generally parallel with the longitudinal axis of the first cylindrical member 10. Each blade 31 is joined along one long edge to one of the long edges of each of the other blades 31, such joined edges forming a central core 32 coincident with the center longitudinal axis of the first cylindrical member 10. The blades 31 axially emanate from the core 32 such that a symentrical four-bladed cross is formed. The trailing edge 33 of each blade 31 is bent in a clockwise direction. The second vane set blades 41 are configured like the first vanes set blades 31 except that the trailing edge 43 of each blade 41 is bent in a counterclockwise direction. The blades 31 and 41 of each vane set 30 and 40 axially extend from their respective center cores 32 and 42 nearly to the inner wall 11 of the first cylindrical member 10. Transverse rods 35 and 45 are inserted through the walls 11 and 14 of the first cylindrical member 10 in line with the cylindrical member's axial diameter so that one each rod 35 and 45 pierces a vane set center core 32 and 42, respectively. The rods 35 and 45 hold each vane set 30 and 40 rigidly in position within the first cylindrical member 10, thereby preventing each vane set 30 and 40 from spinning as the gaseous stream 3 moves through the first cylindrical member 10. The first cylindrical member's inner surface wall 11 has a roughened surface such as might be done with a die grinder.

The second cylindrical member 20, having outside and inside walls 25 and 23, is concentrically positioned about the first cylindrical member 10. Hot exhaust gases 50 or heated coolant from the engine enter an inlet port 21 through the second cylindrical member 20 to a cavity 22 formed between the outer wall 14 of the first cylindrical member 10 and the inner wall 23 of the second cylindrical member 20. The inlet port 21 is located diametrically near the upstream entry point 12 of the gaseous stream 3 into the first cylindrical member 10. The exhaust gases 50 or coolant moves about the outer wall 14 of the first cylindrical member 10 and exits the cavity 22 through the second cylindrical member 20 via an outlet port 24. The outlet port 24 is located diametrically near the downstream exit point 13 of the gaseous stream 3 from the first cylindrical member 10. A layer of insulation 27 is wrapped about the outside wall 25 of the second cylindrical member 20 to protect other engine components and reduce heat loss.

The basic premise of the present invention is that by simultaneously heating and mixing the gaseous stream 3 coming from the carburetor 5 a truly homogeneous air-fuel mixture may be formed for entry into the intake port of the engine block 4. Hot exhaust gases 50 or hot coolant fill and pass through the cavity 22 formed between the concentrically placed first and second cylindrical members 10 and 20. This positioning causes the gaseous stream 3 flowing through the first cylindrical member 10 to heat up and become more agitated, thereby increasing the vaporization of the fuel and the mixing action between fuel vapor and air. To avoid premature detonation of the gaseous stream 3 a temperature sensor 15 is placed within the first cylindrical member 10 in contact with the air-fuel mixture 3 as far down stream 13 from the carburetor 5 or fuel injection unit 6 as possible. When the temperature of the gaseous stream 3 rises to a potential detonation point, a temperature activated valve 16 will begin to close restricting the exhaust gas 50 or coolant entering the inlet port 21, thereby reducing the heat being generated within the cavity 22, and consequently the gaseous stream 3. To increase the mixing action within the first cylindrical member 10, two sets of vanes 30 and 40 are concentrically positioned within the first cylindrical member 10 and configured to interact with the flowing gaseous stream 3. The blades 31 of the upstream vane set 30 twirls the gaseous stream 3 in a clockwise direction. The blades 41 of the downstream vane set 40 reverses such twirling motion counterclockwise creating a greater admixture of fuel and air. The roughly textured inner wall 11 of the first cylindrical member 10 in combination with the heat from the cavity 22 will agitate that portion of the gaseous stream nearest the inner wall 11 thereby eliminating the tendency of the fuel within the gaseous stream 3 to condensate along the inner wall 11.

To prevent a flow reduction due to the resistance of the blades 31 and 41 a turbocharger 7 is connected between the carburetor 5 or the fuel injection unit 6 and the upstream entry point 12 of the first cylindrical member 10. The turbocharger's 7 operation is relatively simple. The heat and flow of exhaust gas 50 from the engine is channeled through a turbine 8 which is connected by a common shaft to a compressor 9 that forces air and fuel from the carburetor 5 or fuel injection unit 6 into the first cylindrical member 10.

It is understood that the above-described embodiment is merely illustrative of the application. Other embodiments may be readily devised by those skilled in the art which will embody the principles of the invention and fall within the spirit and scope thereof.

I claim:

1. A device for increasing the homogenity of the air-fuel stream between the carburetor or fuel injection unit and the intake manifold of an internal combustion engine, comprising:
   a first cylindrical member connected between said carburetor or fuel injection unit and said intake manifold, and containing said air-fuel stream;
   a plurality of sets of vanes concentrically positioned within said first cylindrical member; and
   means for controlled heating of the air-fuel stream within said first cylindrical member.

2. A device as recited in claim 1 further comprising:
   means for driving the said air-fuel stream through said first cylindrical member.

3. A device as recited in claim 2 wherein:
   said first cylindrical member has upstream and downstream ends, an outside wall, and a roughly textured inside wall.

4. A device as recited in claim 3 wherein:
   each set of vanes is comprised of four, generally rectangular blades lying in planes generally parallel with the longitudinal axis of the first cylindrical member.

5. A device as recited in claim 4 wherein:
   each said blade within a set of vanes is joined along one edge to one long edge of each of the other blades within the same set, such joined edges forming a central core coincident with the longitudinal axis of the first cylindrical member.

6. A device as recited in claim 5 further comprising:
   a plurality of transverse rods inserted through the walls of the first cylindrical member in line with the first cylindrical member's axial diameter so that one each rod pierces a vane set center core, holding the blades of each vane set rigidly in position.

7. A device as recited in claim 6 wherein:
   the blades within a set axially emanate from said core within the said set such that a symetrical four-bladed cross is formed.

8. A device as recited in claim 7 wherein:
   the trailing edge of each blade within the first upstream set of vanes is bent in a clockwise direction;
   the trailing edge of each blade within the next downstream set of vanes is bent in a counterclockwise direction; and
   the trailing edge of each blade in successive downstream sets of vanes is bent in a direction opposite to the trailing edge of each blade in the previous upstream set of vanes.

9. A device as recited in claim 8 wherein the means for controlled heating of the air-fuel stream within the said first cylindrical member comprises:
   a second cylindrical member, having an inside and an outside wall, concentrically placed about the first cylindrical member so that a cavity is formed between the outside wall of the first cylindrical member and the inside wall of the second cylindrical mamber; and
   an inlet and an outlet port through the second cylindrical member's outside and inside walls opening into said cavity.

10. A device as recited in claim 9 wherein:
    said inlet port is located diametrically near the upstream end of the first cylindrical member; and
    said outlet port is located diametrically near the downstream end of the first cylindrical member.

11. A device as recited in claim 10 wherein:
    hot exhaust gas or heated coolant from the engine enters said inlet port, into said cavity, about said outer wall of the first cylindrical member, and exits said outlet port.

12. A device as recited in claim 11, further comprising:
    a temperature activated valve between the engine and said inlet port; and
    a temperature sensor within and near the downstream end of the first cylindrical member in contact with the air-fuel stream, connected to and controlling said temperature activated valve.

13. A device as recited in claim 12 wherein:
    said means for driving said air-fuel stream through said first cylindrical member comprises a turbocharger connected between said carburetor or fuel injection unit and said upstream end of the first cylindrical member.

* * * * *